Sept. 16, 1969  O. HANSEN, JR., ET AL  3,466,840
WRAPPING MACHINE
Original Filed April 30, 1964  6 Sheets-Sheet 1

INVENTORS:—
Omar Hansen, Jr.,
Carl Littlefield,
Allen R. Haddix,
By Hibben, Noyes & Bicknell
Attys.

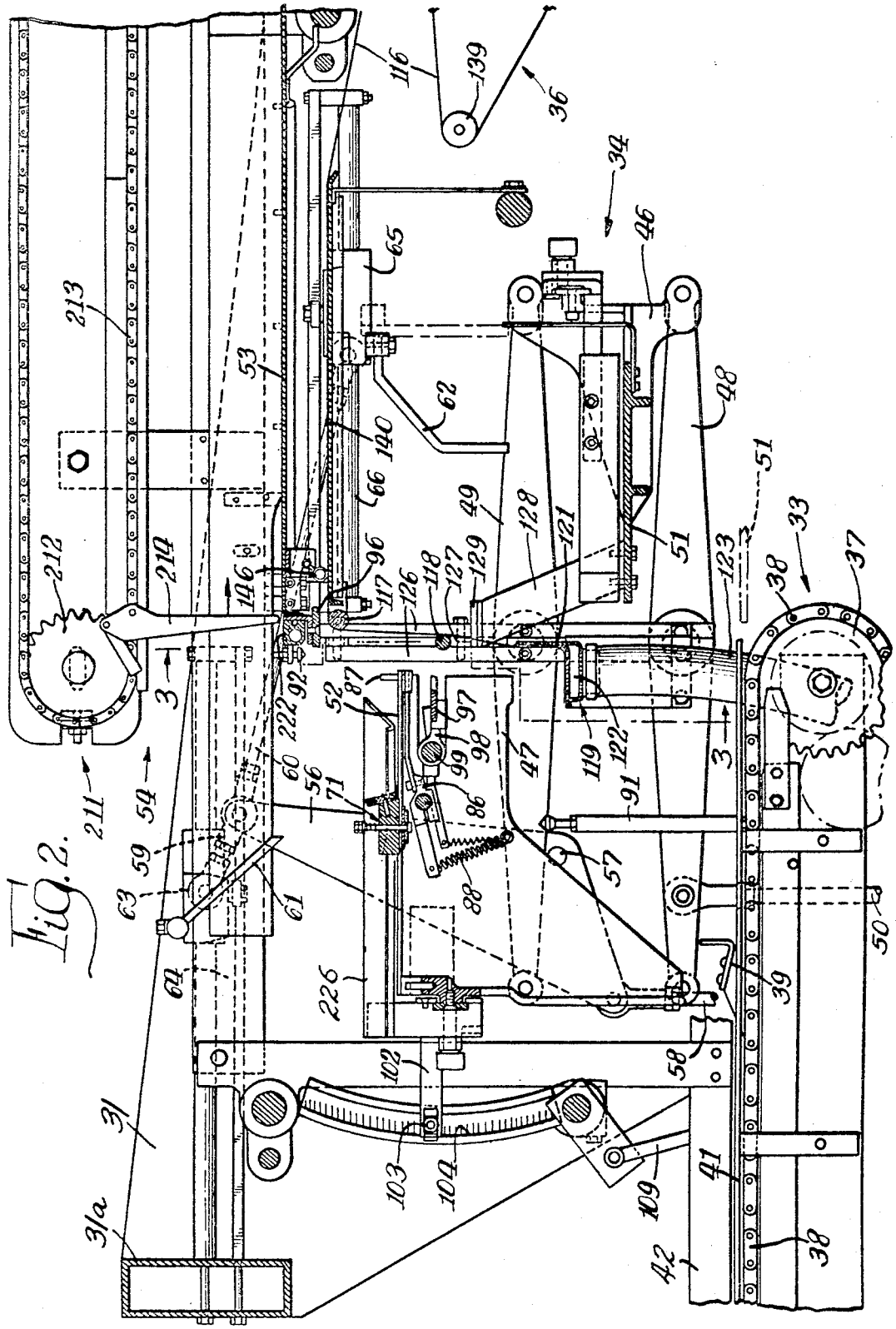

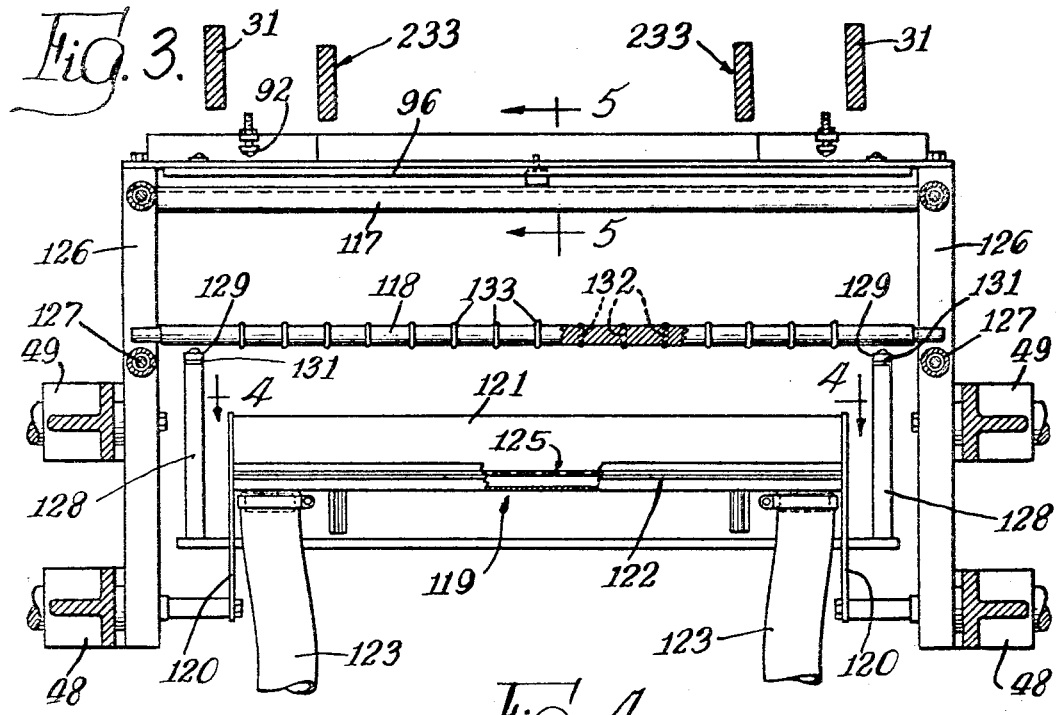
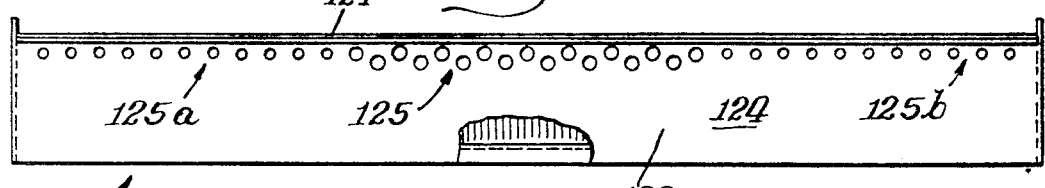
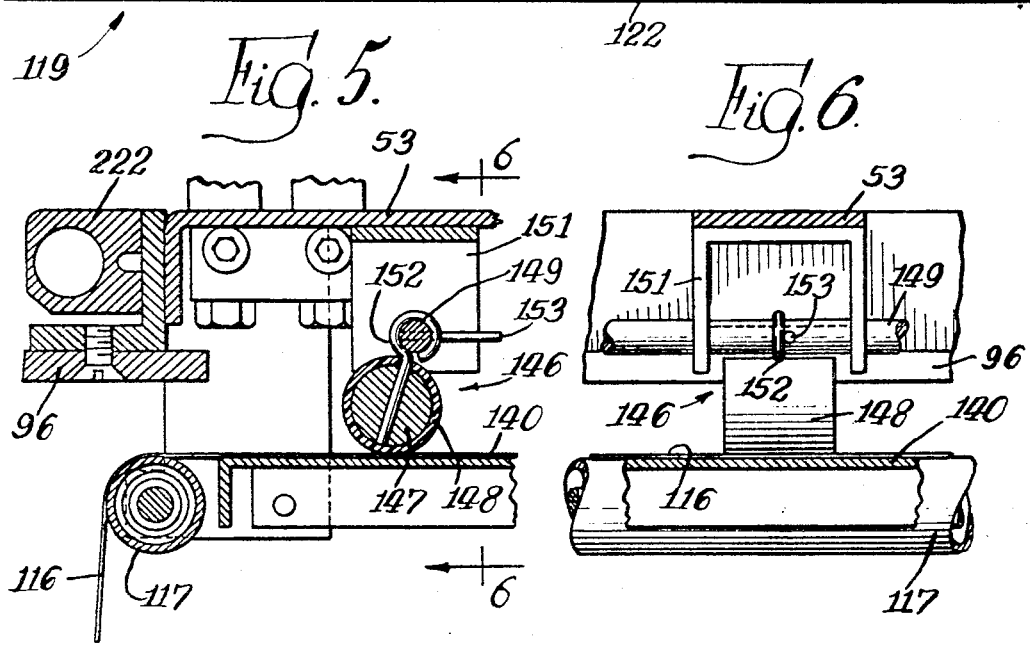

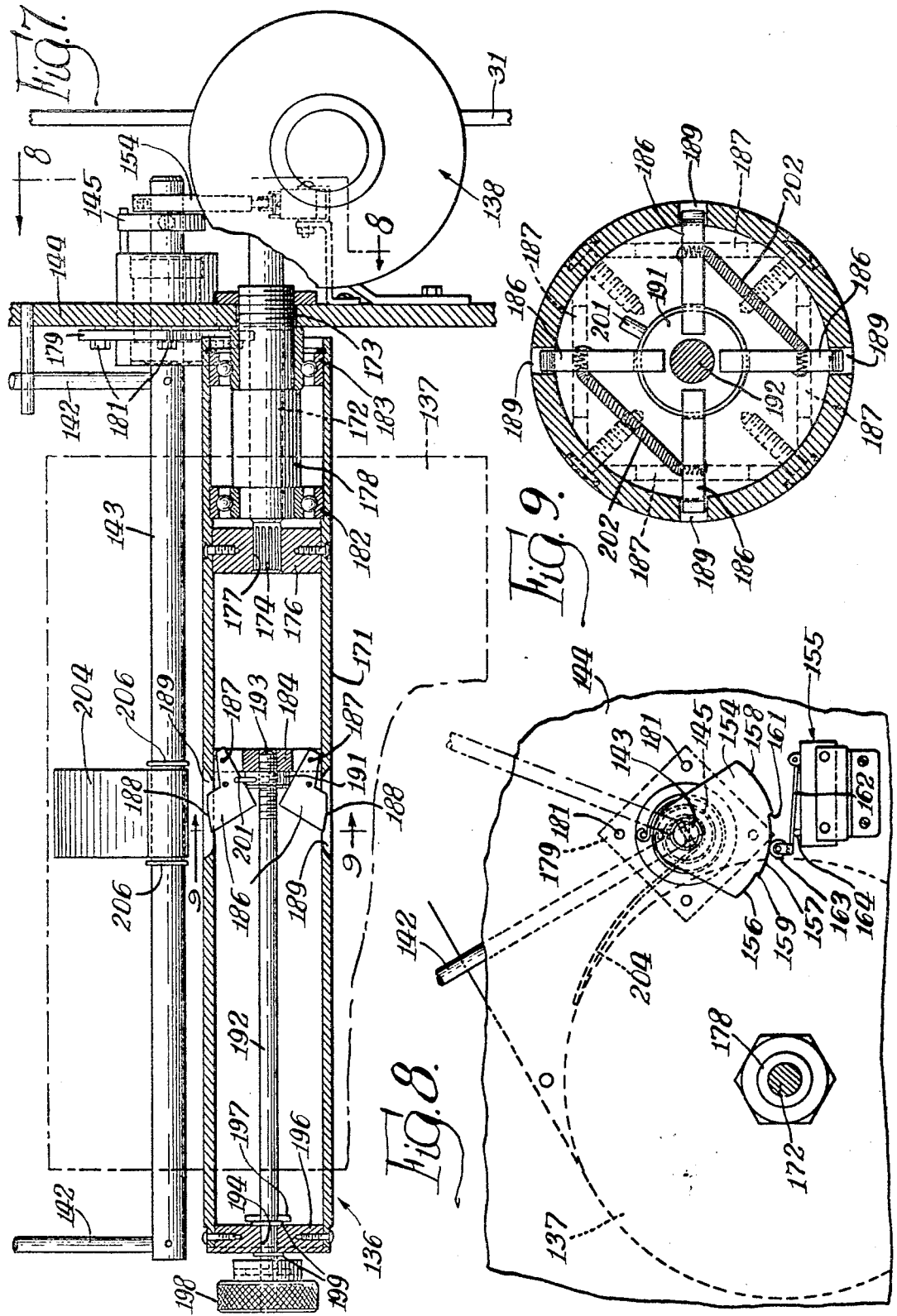

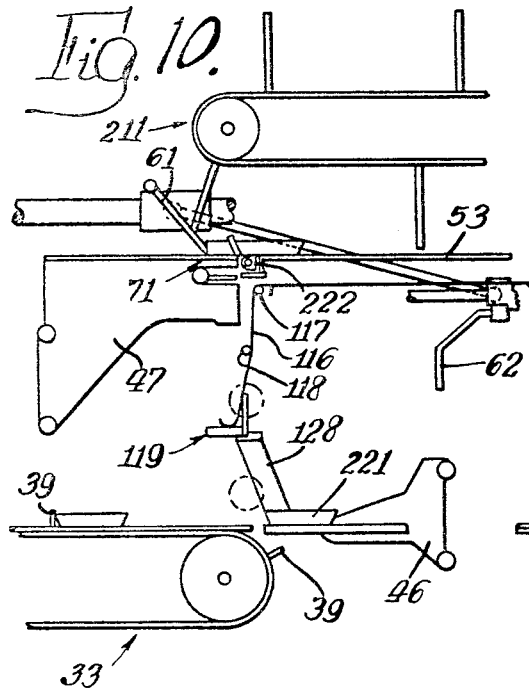
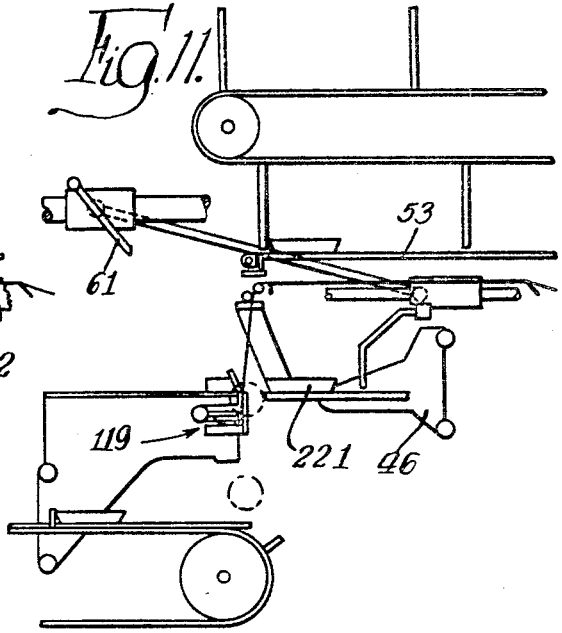
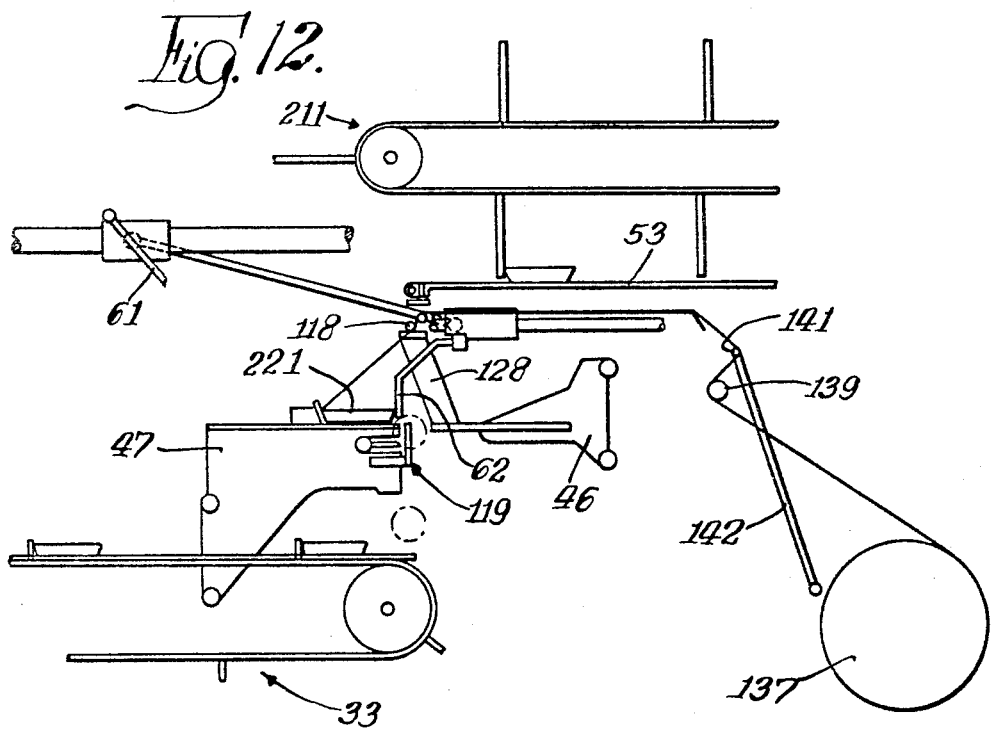

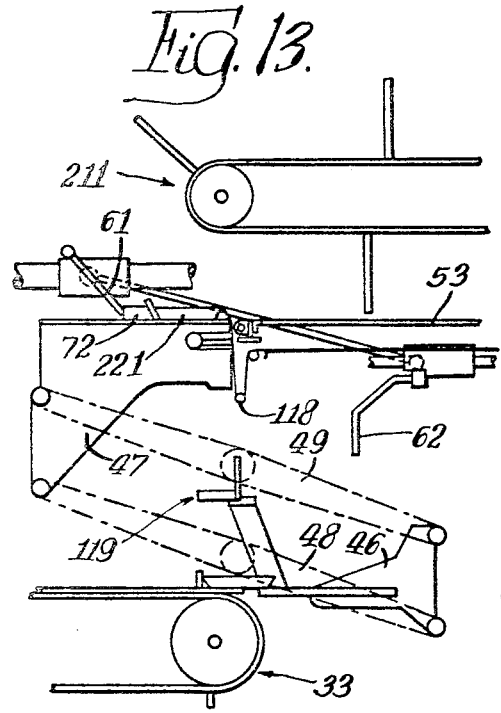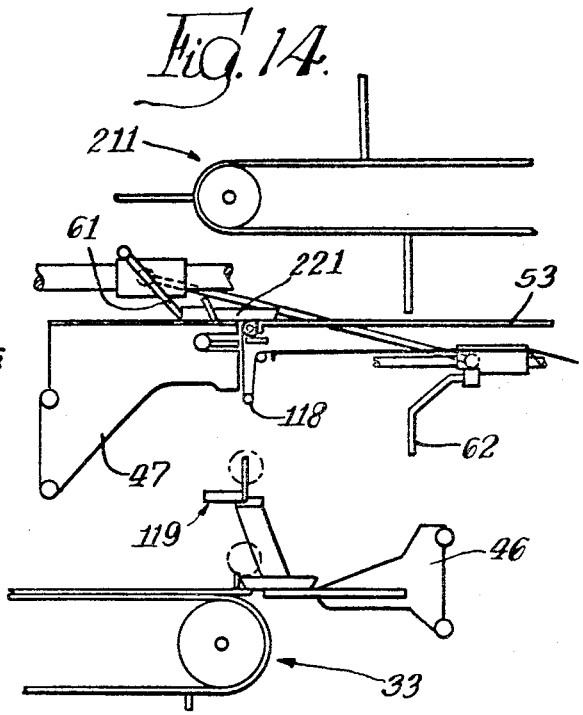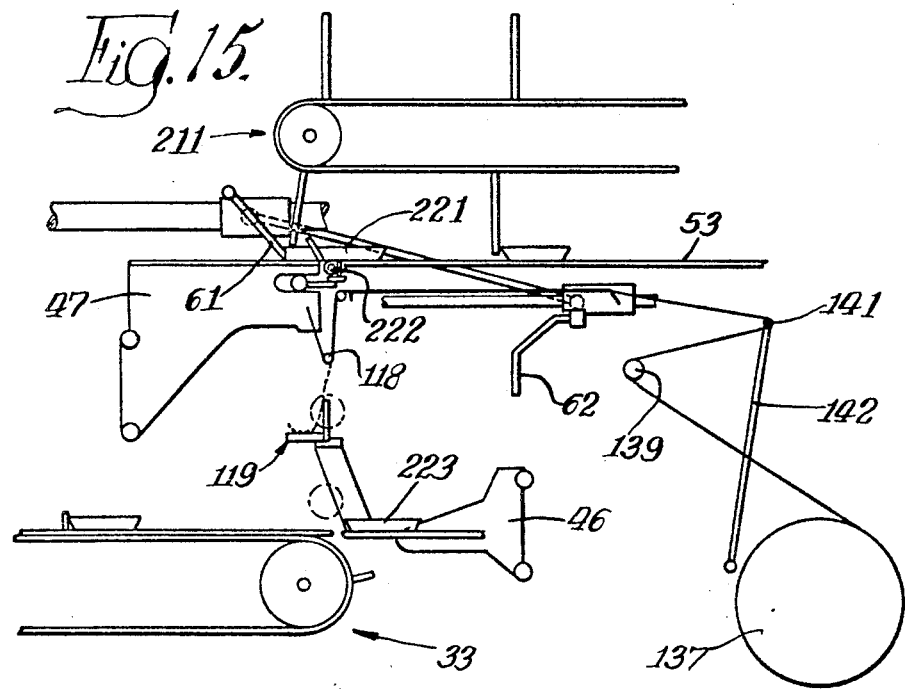

3,466,840
WRAPPING MACHINE
Omar Hansen, Jr., Carl Littlefield, and Allen R. Haddix, Bluffton, Ind., assignors to Franklin Electric Company, Inc., Bluffton, Ind., a corporation of Indiana
Original application Apr. 30, 1964, Ser. No. 363,954. Divided and this application June 30, 1967, Ser. No. 655,988
Int. Cl. B65b *11/16, 51/10, 57/12*
U.S. Cl. 53—74                                  10 Claims

ABSTRACT OF THE DISCLOSURE

This disclosure deals with a wrapping machine for wrapping a series of articles such as foodstuffs in a protective film. An operator of the machine positions each article to be wrapped in a shallow tray and then inserts the tray with the article therein into the machine which folds a section of film about the article and heat seals the package. The film is drawn as needed from a continuous length of film contained on a supply roll.

---

This application is a division of the Hansen et al. copending application Ser. No. 363,954, filed Apr. 30, 1964, and entitled "Wrapping Machine."

Littlefield Patent No. 3,248,848, issued May 3, 1966, discloses a wrapping machine including a wrapping mechanism, and a film supply and transport mechanism for feeding film into the wrapping mechanism, the latter mechanism wrapping the film about each article in a series of articles, and hermetically sealing the film about the articles. The film supply and transport mechanism comprises a clutch including a driving portion and a driven portion, the driving portion being continuously rotated by a drive motor. The driven portion is connected to a device for drawing film from a supply roll when the clutch is engaged, which occurs intermittently. The mechanism further includes a tension arm which senses a need by the wrapping mechanism for additional film and causes engagement of the clutch in response to the need until the need is temporarily satisfied.

While the foregoing mechanism works well, it of course requires a clutch and a film drawing device between the drive unit and the film supply roll. Such clutch and device are disadvantageous first because of the initial expense required to provide them and, second, because they are subject to wear.

In accordance with the present invention, a wrapping machine is provided, including a wrapping mechanism and a film supply and transport mechanism. The latter mechanism comprises a tension arm for providing a reserve supply of film under tension between the wrapping mechanism and a supply roll of film, a rotatable arbor for supporting the supply roll, a drive unit, connected directly to the arbor, and a drive unit control connected to the tension arm. As articles are being wrapped by the wrapping mechanism, film is drawn from the reserve supply, thereby gradually depleting it. When the reserve has been depleted to a predetermined extent, the drive unit control energizes the drive unit, causing the arbor and the supply roll thereon to turn and thereby feed additional film into the reserve supply. When the reserve supply has been replenished, the drive unit control deenergizes the drive unit until the reserve is again depleted.

Objects and advantages of the invention will become apparent from the following detailed description taken in conjunction with the accompanying figures of the drawings, in which—

FIG. 2 is an enlarged fragmentary vertical sectional view of a portion of the wrapping machine;

FIG. 3 is a fragmentary enlarged vertical sectional view taken substantially on the line 3—3 of FIG. 2;

FIG. 4 is a fragmentary enlarged view taken on the line 4—4 of FIG. 3;

FIG. 5 is an enlarged fragmentary view taken on the line 5—5 of FIG. 3;

FIG. 6 is an enlarged sectional view taken on the line 6—6 of FIG. 5;

FIG. 7 is an enlarged fragmentary sectional view taken on the line 7—7 of FIG. 1;

FIG. 8 is a fragmentary side elevational view taken on the line 8—8 of FIG. 7;

FIG. 9 is an enlarged sectional view taken on the line 9—9 of FIG. 7;

FIGS. 10 through 15 are schematic views of a portion of the wrapping machine illustrating a wrapping cycle.

Figure 1:
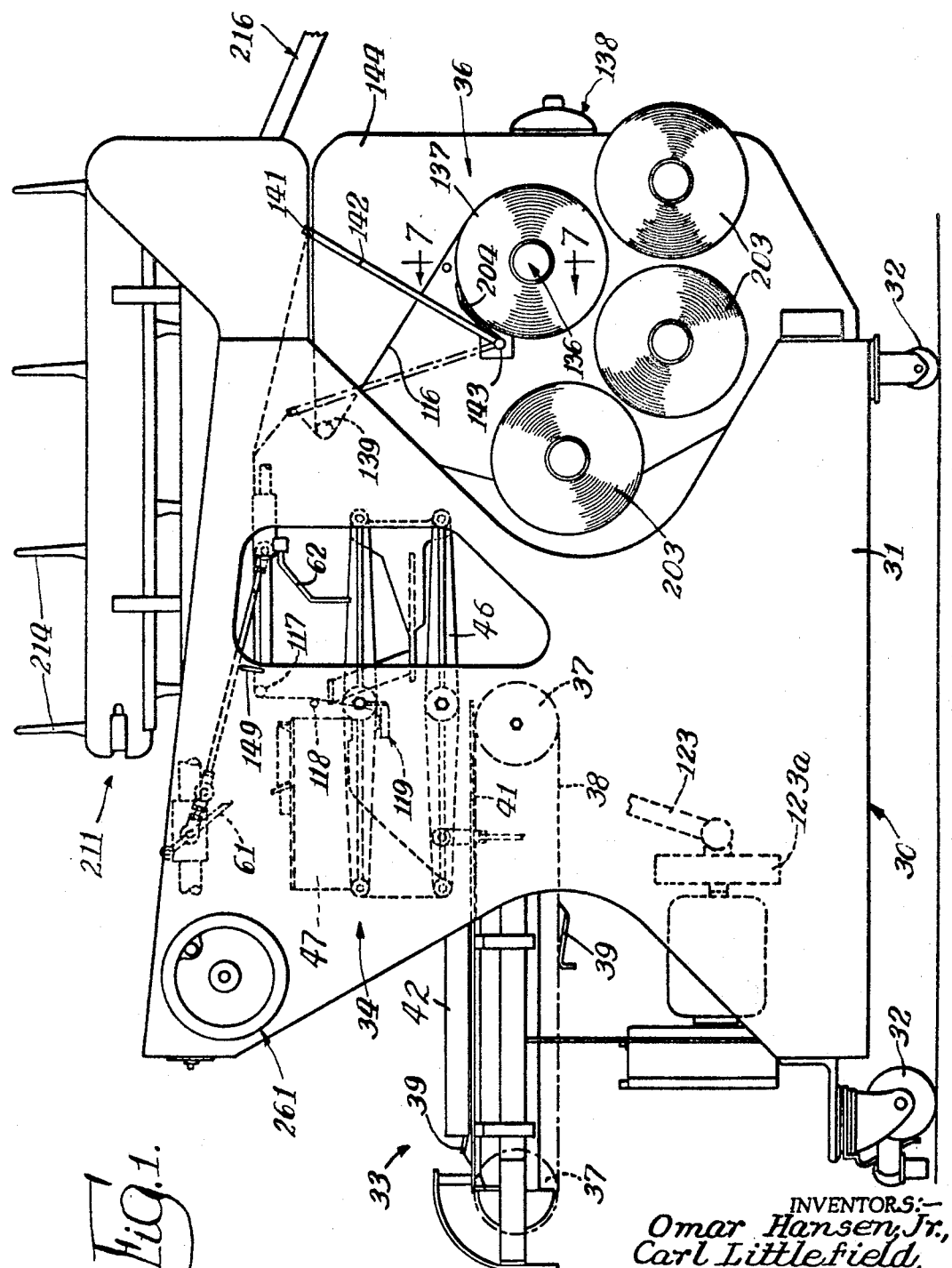
FIG. 1 is a side elevational view of a wrapping machine including a film supply and transport mechanism embodying the invention.

The wrapping machine comprises a frame 30 including two laterally spaced plate like members 31 (FIGS. 1 and 2) connected by suitable braces 31a and mounted on wheels 32 for movement of the machine along the floor. Mounted on the frame between the plate like members 31 are an input mechanism indicated generally by the numeral 33, a wrapping mechanism indicated generally by the numeral 34, and a film supply and transport mechanism indicated generally by the numeral 36.

The input mechanism 33 is in the form of a chain conveyor and includes two pairs of sprockets 37 (FIGS. 1 and 2) and two laterally spaced chains 38 which mesh with the sprockets 37. Attached between the two input chains 38 are a plurality of pushers 39 which push an article placed between the chains rearwardly, or from left to right as seen in FIGS. 1 and 2, as the chains 38 and the pushers 39 are rotated in the clockwise direction. An article to be wrapped is placed on the upper surface of a plate 41 between guides 42, at the front of the machine, and a pusher 39 pushes the article along the upper surface of the plate 41 and into the wrapping mechanism 34. The chains 38 and the pushers 39 are rotated clockwise at a continuous steady rate for a given speed setting. A drive mechanism for the input mechanism 33 may be of the character described in the above mentioned patent application or any conventional drive. It is preferred that the drive motor for the input mechanism 33 also be connected to operate the wrapping mechanism 34 so that the rate of rotation of the chains 38 of the input mechanism 33 will always be directly related to the rate of operation of the wrapping mechanism, and the two rates may be adjusted simultaneously.

The wrapping mechanism 34 comprises a bottom elevator 46 and a top elevator 47 (FIGS. 1 and 2) which are supported by two pairs of arms or bars 48 and 49, one bar of each pair being shown in FIG. 2. One bar of each pair is pivotally connected to one side of each of the elevators 46 and 47, and at substantially their centers the bars 48 and 49 are also pivotally connected to the frame of the machine. At least one, and preferably both, of the lower bars 48 is also pivotally connected to a vertically extending link 50 which extends downwardly from the bar 48 and is connected to be moved substantially vertically in a reciprocating motion by a drive mechanism, which as previously stated is preferably the same drive mechanism as that provided for the input mechanism 33. A suitable drive for the elevators 46 and 47 and bars 48 and 49 is described in the above mentioned patent application and comprises a cam which is connected to be rotated by a drive motor, and a cam follower which is connected by a suitable linkage to the link 50, the construction of the cam and the linkage being such that the link 50 is moved up and down.

Movement of the link 50 causes the two elevators 46 and 47 to swing between horizontally aligned positions and vertically displaced positions. The elevators 46 and 47 have substantially flat plates 51 and 52, respectively, which are always horizontal because the bars 48 and 49 form parallel arms, and when the elevators are in the horizontally aligned positions, the plates 51 and 52 are at substantially the same level. When the elevators 46 and 47 are at the vertically displaced positions, the upper surface of the plate 51 is substantially at the level of the upper surface of the plate 41 of the input mechanism 33, as indicated fragmentarily in dashed lines in FIG. 2, and the upper surface of the plate 52 of the top elevator 47 is substantially at the level of a plate 53 of an end folding and sealing means 54 of the wrapping mechanism 34. The positions of the elevators shown in FIGS. 1 and 2 is intermediate horizontally aligned and vertically displaced positions.

An operator of the machine, standing adjacent the input mechanism 33, places a series of articles on the flat plate 41 and between the pushers 39 attached to the chains 38. The sprockets 37 are rotated in a clockwise direction and cause the pushers 39 to push the articles toward the right. The movement of the chains 38 and the positions of the pushers 39 are adjusted so that each time an article is pushed off the plate 41, the elevators 46 and 47 are in their vertically displaced positions where the bottom elevator 46 is in horizontal alignment with the end of the plate 41.

The wrapping mechanism further includes plunger means for moving an article being wrapped from the bottom elevator 46 to the top elevator 47 when the two elevators are in their horizontally aligned positions, and also for moving the article from the top elevator 47 to the plate 53 when the two elevators are in their vertically displaced positions. The plunger means comprises a bell crank arrangement including a bracket or crank 56 (FIG. 2) which is pivotally mounted by means of a pin 57 on the frame of the machine, a link 58 which connects one end of the crank 56 to the previously mentioned drive mechanism, and a pair of links 59 and 60 connected to the other end of the crank 56 which operate a top plunger 61 and a bottom plunger 62. The drive mechanism construction and its connection to the link 58 is such that the link 58 is periodically moved up and down. A cam and cam follower arrangement of the character described in the previously mentioned patent application may be provided for this purpose. The link 59 is connected to a slider 63 which is mounted on a suitable guide means 64 and carries the top plunger 61. The link 60 is connected to another slider 65 which is mounted on a guide 66 and carries the bottom plunger 62. Vertical movement of the link 58 causes horizontal movement of the sliders 63 and 65 and the plungers 61 and 62. The cams for operating the plungers 61 and 62 and the elevators 46 and 47 are constructed such that the movement of the plungers is synchronized with the movement of the two elevators, the plungers 61 and 62 moving toward the left, or forwardly as seen in FIG. 2, and the plunger 62 pushing an article from the bottom elevator 46 to the top elevator 47 when the two elevators are in their horizontally aligned positions, and the two plungers moving toward the right, or rearwardly, and the plunger 61 pushing an article from the top elevator 47 to the plate 53 when the two elevators are in their vertically displaced positions.

The top elevator 47 is preferably provided with a floating receiver bar 71 which is mounted such that it is able to move longitudinally of the machine at substantially the lateral center of the plate 52.

When an article being wrapped is pushed by the plunger 62 from the bottom elevator 46 to the top elevator 47, the forward edge of the article pushes the receiver bar 71 forwardly and, subsequently, when the article is to be pushed by the plunger 61 from the top elevator 47 to the plate 53, the plunger 61 engages and pushes the receiver bar 71 and the article toward the right until the article is deposited on the plate 53.

During a wrapping cycle, when the top elevator 47 is moving upwardly with an article on the plate 52, the film is stretched tightly across the upper surface of the article, and there is a tendency for the taut film to pull the article rearwardly off the plate 52 of the top elevator 47. To prevent the article from being pulled by the film off of the top elevator 47, a rake-like bracket 86 (FIG. 2) is provided having a plurality of generally vertical stop fingers 87 which are adjacent the rearward edge of the plate 52. The bracket 86 is mounted underneath the plate 52 for pivotal movement relative to the top elevator 47. Through the action of the spring 88, a bracket 86 is normally in the position shown in FIG. 2 where the fingers 87 extend through slots formed in the rear edge of the plate 52, the ends of the fingers 87 extending upwardly above the upper surface of the plate 52. The fingers 87 must of course be retracted below the upper surface of the plate 52 when an article is being transferred on to or off of the plate 52, and, for this purpose, a bottom actuator 91 and a top actuator 92 are provided. The bottom actuator 91 is mounted on the plate 41 of the input mechanism 33 and extends upwardly therefrom at a position where it engages the bracket 86 and thereby rotates the bracket 86 in the clockwise direction to retract the fingers 87 when the top elevator 47 is aligned with the bottom elevator 46. When the top elevator 47 is moved upwardly with an article thereon, the bracket 86 moves out of engagement with the actuator 91 and the fingers 87 move upwardly, and the article is held between the fingers 87 and the receiver bar 71. When the elevator 47 reaches its uppermost position, the top actuator 92 engages the bracket 86 and pivots the bracket 86 clockwise which also causes the fingers 87 to be retracted below the upper level of the plate 52, thereby permitting the article to be pushed off of the top elevator 47 on to the plate 53. Of course, as soon as the elevator 47 moves downwardly, the bracket 86 is moved out of engagement with the top actuator 92 and the fingers again extend upwardly above the upper surface of the plate 52.

The wrapping mechanism 34 further includes scissor-like means for severing the film after it has been wrapped around an article. The severing means comprises a horizontal laterally extending stationary blade 96 which is fixed to the frame just below and forwardly of the forward edge of the plate 53. The severing means further includes a pair of movable blades 97 carried by the top elevator 47 on the underside thereof. The blades 97 are carried by brackets 98 (FIG. 2) mounted on a shaft 99, the shaft being mounted on the underside of the top elevator for longitudinal movement. During each wrapping cycle, the blades 97 engage the blade 96 with the film therebetween, and the blades 97 are moved forwardly slightly to sever the film, and then they are retracted. Such longitudinal movement of the blades 97 is obtained by cam 104 and a follower 103 mechanism, the cam 104 being connected to the main drive motor and the follower 103 being connected to the shaft 99 by a link 102.

The film, indicated by the numeral 116, for wrapping an article, is delivered to the wrapping mechanism 34 by the film supply and transport mechanism 36 embodying the present invention and to be described in greater detail hereinafter, and passes over a stationary roller 117 (FIGS. 2, 3, 5 and 6) mounted on the frame and extending laterally thereof just below the stationary cutting blade 96 of the severing means. When the wrapping machine is idling between packages, the film 116 hangs downwardly from the roller 117 and passes rearwardly of a dancer roll 118 (FIGS. 2 and 3), and the lower or free end of the film 116 is held by a suction baffle plate 119 (FIGS. 2 and 3). The baffle plate 119 extends laterally of the machine and is secured to the frame by brackets 120, and comprises a vertically extending back 121 and a horizontal shelf 122 which extends forwardly from the lower edge of the back 121. The shelf 122 has a hollow interior which forms a suction box, each end of the shelf 122 being connected by a length of hose 123 to means, such as a motor driven fan, 123a for producing a partial vacuum. The top side 124 of the shelf 122 has three sets 125, 125a and 125b of holes formed therein, and air is drawn into the interior of the shelf 122 through the holes. The suction draws the film 116 to the shelf 122 and holds the lower or free end of the film 116 flat against the shelf 122, thereby preventing curling of the free end of the film 116.

The dancer roll 118 also extends laterally of the machine and is mounted between two pairs of vertically extending guides 126 (FIGS. 2 and 3) the guides permitting free movement of the dancer roll 118 in a vertical direction. The dancer roll 118 normally rests on a stop 127 secured between the two guides 126 of each pair. Since the dancer roll 118 might be in the way when an article is to be transferred from the bottom elevator 46 to the top elevator 47, a lifter arm 128 is secured to each side of the bottom elevator 46 and positioned to raise the dancer roll 118 upwardly between the guides 126 sufficiently high to permit the article to be transferred from the bottom elevator 46 to the top elevator 47. The position of the stops 127 for the dancer roll 118 must be adjusted so that, after an article has been wrapped and the film severed, the length of the film from the lower side of the dancer roll 118 to the severing means must be sufficiently long to permit the free end of the film to fall down and be caught by the suction baffle plate 89 and thereafter extend under the forward edge of the next article to be wrapped.

A piece of neoprene 129 is preferably secured to the upper end of each lifter 128. It has been found that repeated impact between the piece of neoprene 129 and the dancer roll 118 each time the bottom elevator 46 is moved upwardly causes fairly rapid deterioration of the neoprene 129. This may be prevented by inserting a layer 131 of very resilient material such as polyester foam between the upper end of each lifter 128 and the neoprene 129, the layers 131 absorbing the shock of impact between the dancer roll 118 and the neoprene 129 and greatly prolonging the life of the neoprene 129.

The dancer roll 118 is preferably made of metal, and some types of film tend to cling to the dancer roll 118 due to static electricity. This may be prevented by forming a plurality of circumferential grooves 132 (FIG. 3) at axially spaced locations, and positioning a rubber O-ring 133 in each groove 132. The outer diameter of the O-rings 133 is greater than the diameter of the portions of the dancer roll 118 between the grooves 132, and the O-rings hold the film 116 away from the metal and thereby prevent the previously mentioned clinging.

The film supply and transport mechanism 36 comprises an arbor 136 (FIGS. 1 and 7) for supporting a supply roll 137 of film, the arbor 136 being connected to be driven by a motor-gear box unit 138. The path of the film from the supply roll 137 extends around an idler roller 139 (FIGS. 1 and 2), around a tension roller 141, over the top of a generally horizontal film support plate 140, and over the roller 117, previously described. The idler roller 139 is mounted between the plates 31 of the frame, and the tension roller 141 extends laterally of the machine and is rotatably mounted between the upper ends of two laterally spaced swing arms 142. The two swing arms 142 are secured to a shaft 143 which extends laterally of the machine and is rotatably mounted on a plate 144 (FIGS. 1 and 7) of the frame of the machine. The plate 144 is generally parallel to one of the plates 131 and is laterally spaced a short distance therefrom, and the arbor 136 and the shaft 143 are cantilevered from one side of the plate 144 and the motor 138 is mounted on the opposite side of the plate 144. Means, such as a torsion spring 145 (FIG. 7) is connected to the shaft 143 and the plate 144 and constantly urges the shaft 143, and of course the swing arms 142, in the clockwise direction, as seen in FIG. 1.

The film supply and transport mechanism 36 further includes a film check valve 146 (FIGS. 2, 3, 5 and 6) mounted above the plate 142 adjacent the roller 117, the check valve 146 permitting movement of the film 116 in the forward direction only, unless it is disengaged. The check valve 146 comprises a relatively heavy metal rod 147 (FIG. 5) which is preferably wrapped in a layer 148 of high friction material such as polyester foam. The rod 147 is suspended from a laterally extending rod-like valve handle 149 which extends outside the frame of the machine and is turned at a right angle to form a handle (FIG. 1), the handle 149 being rotatably held by a bracket 151 secured to the underside of the plate 53 at substantially the lateral center of the machine. An eye bolt 152 is secured to the rod 147 and the handle 149 extends loosely through the eye of the bolt 152. The handle 149 is sufficiently close to the plate 140 that the rod 147 rests on the film on top of the plate 140, and the eye bolt 152 carrying the rod 147 normally extends forwardly from the handle 149, and the weight of the rod 147 is sufficient to prevent the film 116 from being pulled rearwardly. To disengage the film check valve, a pin 153 (FIG. 5) is secured to the handle 149 adjacent the rod 147, and when the handle 149 is pivoted clockwise as seen in FIG. 1, the pin 153 engages the rod 147 and swings it forwardly and upwardly out of engagement with the film, permitting the film 116 to be pulled rearwardly.

When the wrapping machine is idling between packages, the free end of the film 116 is held by the baffle plate 119 as previously described, and the arbor 136 and the supply roll 137 are held against rotation by the motor and gear box unit 138. A consant and uniform tension is maintained on the length of film 116 between the supply roll 137 and the film check valve 146 by the swing arms 142 which, as previously explained, are constantly urged in the clockwise direction as in FIG. 1 by the torsion spring 145. After an article is fed into the wrapping mechanism and a wrapping cycle begins, the film 116 is pulled forwardly during the wrapping operation and the swing arms 142 swing in the counterclockwise direction as seen in FIG. 1. At a predetermined angle of the swing arms 142, a cam 154 (FIGS. 7 and 8) secured to the shaft 143 actuates a switch mechanism 155 which controls the drive unit 138. The cam 154 has three cam surfaces 156, 157 and 158 (FIG. 8), each being an arc having the axis of the shaft 143 as its center. The surface 157 is between the surfaces 156 and 158 and its radius is intermediate the radii of the surfaces 156 and 158. The juncture 159 of the surfaces 156 and 157 is referred to as the "off" point and the juncture 161 of the surfaces 157 and 158 is referred to as the "on" point.

The switch mechanism 155 includes a pivotally mounted actuating arm 162 having a roller 163 at its free end, the roller 163 engaging the surfaces 156 to 158. The mechanism 155 further includes a button 164 which is actuated by movement of the arm 162.

When film is demanded during a wrapping cycle, the arms 142 and the cam 154 are pulled by the film clockwise as seen in FIG. 8. When the roller 163 is engaged by the on point 161, the motor drive unit 138 is turned on by the switch mechanism 155, causing the supply roll 137 to be rotated and feed additional film. After the film has been wrapped lengthwise about the article and the film has been severed, the check valve 146 prevents the film 116 from being pulled back but the drive unit 138 for the supply roll 137 continues to be energized. As additional film is unrolled, the tension arms 142 swing in the counterclockwise direction as seen in FIG. 8 and when the off point 159 of the cam 154 passes the roller 157 of the switch mechanism 155, the drive unit 138 is deenergized. Dynamic braking causes the motor to stop almost instantly.

In summary, when the cam 154 pivots clockwise as seen in FIG. 8, the switch mechanism 155 is turned on at the on point 161 and on opposite pivotal movement, the mechanism 155 is turned off at the off point 159. The cam surface 157 between the points 159 and 161 may be referred to as a storage differential area. In addition to the described advantages, the construction also eliminates off center film tracking problems and jerks from sudden pulling of the film, and is able to pay out a number of types of film without distortion.

The arbor 136 for the supply roll 137 and the mounting of the arbor on the plate 144 is illustrated in FIGS. 7 and 9. The arbor 136 comprises, cylindrical tube 171, the outer diameter of which is slightly less than the inner diameter of the supply roll 137 so that the roll 137 may be easily slipped over the tube 171. The drive unit 138 includes a drive shaft 172 which extends through an opening 173 formed in the plate 144, and the tube 171 is positioned coaxially over the drive shaft 172. The end of the shaft 172 is splined at 174, and a mounting plate 176 secured to the interior of the tube 171 has a splined center opening 177 which mates with the splined end 174 of the shaft 172, so that, when the drive unit 138 is energized, the tube 171 will rotate with the drive shaft 172.

The tube 171 is rotatably mounted on the plate 144 by means of a bearing housing 178 in the form of a sleeve, which is positioned around the portion of the drive shaft 172 between the two plates 144 and 176, and the bearing housing 178 is secured to the plate 144 by a nut 179 and bolts 181 (FIGS. 7 and 8). The tube 171 is rotatably mounted on the bearing housing 178 by two ball bearing units 182 and 183, the inner race of each unit 182 and 183 being secured to the housing 178 and the outer race of each unit being secured to the inner periphery of the tube 171. Thus, the tube 171 is free to rotate relative to the housing 178 and the plate 144 due to the ball bearing units, and it is driven by the drive unit 138 and the drive shaft 172 which extends through the bearing housing 178 and connects to the plate 176.

Means is also provided for securing the supply roll 137 to the tube 171 for rotation therewith, comprising a toggle mounting plate 184 which is secured to the inner periphery of the tube 171 at approximately its longitudinal center. Four fingers 186 (FIGS. 7 and 9) are pivotally connected to the mounting plate 184 by pins 187, each finger 186 including a knurled outer surface 188 adapted to extend outwardly of the tube 171 through four slots 189 formed in the tube 171. The apparatus further includes means for forcing the fingers 186 radially outward into tight engagement with the inner periphery of the supply roll 137 when the roll 137 is to be held, and for retracting the fingers 186 in order to release the supply roll 137. This means comprises a nut 191 (FIG. 7) which is threaded on the end of a threaded rod 192, the outer periphery of the nut 191 being adapted to engage the radially inner surface of each finger 186. The rod 192 is positioned in a hole 193 formed in the mounting plate 184 and is free to rotate relative to the plate 184, and the other end of the rod 192 is rotatably positioned in a hole 194 formed in a cap 196 secured within the free end of the tube 171. The rod 192 is prevented from moving axially relative to the cap 196 by a roll pin 197 and a knurled knob 198, the pin 197 and the knob 198 being secured to the rod 192 on opposite sides of the cap 196. Thrust washers 199 are preferably positioned on both sides of the cap 196.

When the rod 192 is rotated in one direction by manually turning the knob 198, the nut 191 begins to turn with the rod 192 due to friction but a stop pin 201 secured to the nut 191 and extending radially outward therefrom engages one of the fingers 186 and thus prevents further rotation of the nut 191. The nut 191 then moves axially of the rod 192 to the left as seen in FIG. 7 and forces the fingers 186 outwardly and the knurled surfaces 188 into tight engagement with the inner periphery of the supply roll 137.

When the roll 137 is to be removed from the arbor 136, the knob 198 and rod 192 are turned in the opposite direction and the nut 191, after turning through an arc of approximately 90 degrees and the pin 201 engaging another of the fingers 186, moves axially toward the right as seen in FIG. 7 thereby releasing the outward pressure on the fingers 186. Two springs 202 (FIG. 9) are provided, one spring 202 being secured to two adjacent fingers 186 and the other spring being secured to the other two fingers, and the springs 202 draw the outer ends of the fingers 186 radially inward as the nut 191 moves to the right.

Thus, a supply roll 137 may be removed from the arbor 106 simply by rotating the knob 198 to retract the fingers and then pulling the supply roll 137 off the end of the arbor, and a fresh roll may be mounted on the arbor by sliding it over the tube 171 and again turning the knob 198 to extend the fingers 186. As shown in FIG. 1, a plurality of rods may be secured to the plate 144 for mounting a plurality of spare supply rolls 203 at a convenient location on the machine. The supply rolls may be of a different material or they may differ in their lateral width. A plurality of marks (not shown) are preferably formed on the outer surface of the tube 171 to help center a supply roll 137 axially on the arbor.

Since some types of film material tend to cling together due to static electricity or other causes, a film lifter 204 (FIGS. 1, 7 and 8) is loosely mounted on the shaft 143 at substantially its axial center. The lifter 204 may be simply a generally rectangular plate 204 having one end bent around the shaft 143 and its other or free end bent to generally the curvature of the supply roll 137. The lifter 204 may be prevented from moving axially along the shaft 143 by two rings 206 (FIG. 7) which are secured to the shaft 143 on opposite sides of the lifter 204. The free end of the lifter 204 is permitted to slide on top of the supply roll 137 as it is rotated, underneath the outer layer of the film 116 which is being peeled off, thereby preventing the outer layer of the film from clinging to the remainder of the roll.

The wrapping mechanism 34 further includes the end folding and sealing means 54, such means including a longitudinally extending top conveyor 211 (FIGS. 1 and 2) for moving articles across the plate 53, the plate 53 also forming part of the end folding and sealing means. The top conveyor 211 is mounted on the frame of the machine over the top of the plate 53 and comprises two pairs of laterally spaced sprockets 212 (FIG. 2), the sprockets 212 carrying two chains 213. Each chain 213 carries a series of longitudinally spaced apart transport arms 214, the arms 214 of the two chains forming laterally aligned pairs. The lower ends of the transport arms 214 sweep across the upper surface of the plate 53 when the arms 214 are in the rearward moving portion of their cycle. The chains and the arms are rotated in the counterclockwise direction as seen in FIG. 2, and after an article has been pushed from the top elevator 47 onto the plate 53 by the top plunger 61, the article is picked up by a pair of the transport arms 214 and pushed rearwardly across the plate 53 to an output conveyor 216 (FIG. 1).

The sprockets 212 are mounted on shafts 217 for rotation on the frame of the machine and are connected to a drive unit which drives the chains 213 continuously at a rate that is directly related to the speed of operation of the wrapping mechanism. The arms 214 are positioned such that a pair of arms pick up each package after it has been deposited on the plate 53 by the top plunger. The drive unit for the chains 219 is preferably the same one as for the infeed conveyor 33, the wrapping mechanism 34, the plungers 61 and 62, and the severing means, so that the rate of operation of all of these mechanisms will always be directly related and all may be adjusted by simply adjusting the speed of a single drive unit. Such a drive unit however is preferably separate from the drive unit 138 for the film feed.

The end folding and sealing means 54 comprises a pair of laterally spaced first folders 226 mounted on the top elevator 47 which cause a crease or fold to be formed in the forward portion of the film at both ends of an article as the article is pushed on the top elevator 47.

As the top elevator 47 and an article thereon are being moved upwardly to the level of the plate 53, the film 116 is drawn tightly across the top of the article and the fingers 87 prevent the article from being pulled by the film 116 off of the rearward edge of the top elevator 47. The end folding and sealing means 54 further includes a pair of laterally spaced downfolders 233 (FIGS. 1 and 3) which are positioned vertically over the first folders 226. When the top elevator 47 is in its uppermost position, the portions of the film 116 which overlie the first folders 226 are compressed between the folders 226 and 233, thus causing the film 116 to be drawn tightly endwise across an article being wrapped.

After the top elevator and the article are in the uppermost position, the top plunger pushes the article rearwardly onto the plate 53, as previously explained. Of course, the fingers 87 have previously been retracted.

Concurrent with the article being transferred from the top elevator to the plate 53, the film is severed after it has been folded longitudinally around the article, and a tack sealer 222 tack seals the overlapped portions of the film.

Rearwardly of the tack sealer, the plate 53 comprises means for supporting the article and means for folding the end portions of the film underneath the article. Once the end portions of the film are folded flat against the underside of the article, the article is pushed across a main heater or sealer located just in front of the conveyor 216 which is sufficiently hot to bond or fuse the overlapped portions of the film on the underside of the article and hermetically seal the article in the film.

Means such as rollers at the longitudinal edges of the article are also provided for pressing the article firmly against the main sealer.

FIGS. 10 to 15 illustrate schematically the portion of a wrapping operation cycle wherein the film is wrapped lengthwise around an article, indicated by the numeral 221. An operator of the machine places the article on the infeed conveyor mechanism 33 and one of the pushers 39 pushes the article 221 onto the bottom elevator 46. FIG. 10 shows the condition of the machine just after the article 221 has been placed on the bottom elevator 46, the elevators 46 and 47 being in their vertically displaced positions. After the article 221 has been placed on the bottom elevator 46, the bars 48 and 49 swing in the counterclockwise direction as seen in FIG. 2, and move the elevators 46 and 47 to their horizontally aligned positions, shown in FIGS. 11 and 12. As soon as the elevators 46 and 47 reach the horizontally aligned positions, the plunger mechanism is shifted forwardly and the bottom plunger 62 sweeps across the plate 51 of the bottom elevator 46 and pushes the article 221 forwardly, causing the forward edge of the article 221 to contact the suspended length of the film 116 and slide over the free end of the film as it moves onto the top elevator 47. The receiver bar 71 is initially adjacent the rearward edge of the top elevator 47, and the film 116 is caught between the article 221 and the receiver bar 71, and continued movement of the article 221 forwardly on the top elevator causes additional film 116 to be pulled into the wrapping mechanism, the swing arms 142 swinging as previously explained. The receiver bar 71 is pushed forwardly by the article 221. FIG. 11 shows positions of the article 221 and the elevators just before the article is pushed from the bottom elevator onto the top elevator, and FIG. 12 shows the position of the article 148 after it has been pushed completely on to the top elevator 47. The dancer roll 118 has been lifted upwardly by the two lifts 128 to permit the article 221 to be transferred from the bottom elevator to the top elevator.

After the article 148 has been transferred to the top elevator 47, the bars 48 and 49 swing in the clockwise direction and shift the elevators 46 and 47 to their vertically displaced positions (FIG. 13). As the bottom elevator 46 moves downwardly, the lifts 128 for the dancer roll 118 also move downwardly and permit the dancer roll 118 to rest on the tops 127. As the top elevator 47 and the article 221 move upwardly, the film 116 is pulled tightly across the top of the article 221 and it folds downwardly over the rear edge of the article 221 and loops underneath the dancer roll 118 (FIG. 13). In this position of the elevators, the plate 52 of the top elevator 47 is in horizontal alignment with the plate 53, and the plunger mechanism is then shifted rearwardly, the plunger 61 engaging the receiver bar 67 and causing a transfer of the article 221 to the plate 53, as shown in FIGS. 14 and 15. As the article 221 is being transferred to the plate 53, the film 116 is drawn underneath the rearward edge of the article 221, and when transfer of the article to the plate 53 is complete, the film overlaps the free end. The top plunger pushes the article 221 to a position where the overlapped portions of the film rest on the tack sealer which causes the overlapped portions of the film to be bonded or fused together over its entire width. After the bonding of the overlapped portions of the film is complete, the severing means is actuated to sever the film (FIG. 15) and the free end of the film 116 falls downwardly and is captured and held by the suction baffle plate 119, and a pair of transport arms 214 engage the article and push it rearwardly through the end folding and sealing means 54.

As the article 221 is being transferred from the top elevator to the plate 53, another article 223 (FIG. 15) is being transferred by the input mechanism 33 to the bottom elevator 46 and the cycle is repeated.

To summarize the folding of the portions of the film at the ends of the article, a pleat or fold is formed by the first folders 226 when the article is pushed onto the top elevator 47, and the down folders 233 tighten the film endwise across the top of the article when the top elevator moves upwardly. As the article is pushed rearwardly by the arms 214, the end portions of the film are turned under the article, and the ends of the article where the folds are, are pressed firmly against the main sealer which seals the film around the article. The transport arms 214 then push the article to the output conveyor 216, which may lead to a transfer and labeling machine for automatically weighing and labeling the article.

To accommodate articles of different widths, means is preferably provided to adjust the lateral positions of the guides 42 of the infeed mechanism 33, guides on the lower elevator 46, the first folders 226, the top folders 233, the end folding means, the transport arms 214, and the means for pressing the articles against the main sealer. Such adjustment may be effected by means including a hand wheel 261 (FIG. 1) located adjacent the outer face of one of the plate members 31.

All of the materials of the wrapping machine may be made of stainless steel and plastics which may be cleaned by steam, in order to meet various health ordinances requiring such a cleaning on machines for handling food.

We claim:

1. In a wrapping machine including a mechanism for wrapping an article in a film and sealing the film, the wrapping mechanism being adapted to act in conjunction with the article and pull film as needed for wrapping the article, the improvement comprising mechanism for feeding and transporting the film to the wrapping mechanism, comprising a rotatable arbor for supporting a supply roll of film, a drive unit coupled to rotate said arbor when energized, tension means mounted for movement relative to said wrapping mechanism and said arbor, the path of the film extending from said supply roll, about said tension means, and to the wrapping mechanism, the film as it is wrapped exerting a pull on said tension means and causing said tension means to be moved in a first direction as an article is being wrapped, biasing means for urging said tension means in a direction generally opposite said first direction and thereby maintaining tension on the film as it is being wrapped, and actuator means coupled to said tension means for controlling energization of said drive unit, said actuator means being adapted to energize said drive unit when said tension means has been moved by the film in said first direction to a predetermined location and being adapted to deenergize said drive unit when said tension means has been moved by said biasing means in said generally opposite direction to another predetermined location.

2. In a machine for utilizing film and arranged to pull film as needed, the improvement comprising mechanism for feeding and transporting the film to the utilizing portion of the machine, comprising a rotatable arbor for supporting a supply roll of film, a drive unit coupled to rotate said arbor when energized, tension means mounted for movement relative to said utilizing portion and said arbor, the path of the film extending from said supply roll, about said tension means, and to the utilizing portion, the film as it is wrapped exerting a pull on said tension means and causing said tension means to be moved in a first direction as an article is being wrapped, biasing means for urging said tension means in a direction generally opposite said first direction and thereby maintaining tension on the film as it is being wrapped, and actuator means coupled to said tension means for controlling energization of said drive unit, said actuator means being adapted to energize said drive unit when said tension means has been moved by the film in said first direction and being adapted to deenergize said drive unit when said tension means has been moved by said biasing means in said generally opposite direction, said tension means comprising a pair of spaced apart arms and a tension roller mounted on and between said arms, said arms being mounted for pivotal movement on an axis generally parallel to the axis of said tension roller.

3. Apparatus as in claim 2, wherein said arms are secured to a rotatably mounted shaft, the axis of said shaft being generally parallel to the axis of said tension roller, and said biasing means comprises a torsion spring connected to said rotatable shaft and tending to pivot said shaft and thereby swing said arms and said tension roller in said opposite direction.

4. In a machine for utilizing film and arranged to pull film as neded, the improvement comprising mechanism for feeding and transporting the film to the utilizing portion of the machine, comprising a rotatable arbor for supporting a supply roll of film, a drive unit coupled to rotate said arbor when energized, tension means mounted for movement relative to said utilizing portion and said arbor, the path of the film extending from said supply roll, about said tension means, and to the utilizing portion, the film as it is wrapped exerting a pull on said tension means and causing said tension means to be moved in a first direction as an article is being wrapped, biasing means for urging said tension means in a direction generally opposite said first direction and thereby maintaining a tension on the film as it is being wrapped, and actuator means coupled to said tension means for controlling energization of said drive unit, said actuator means being adapted to energize said drive unit when said tension means has been moved by the film in said first direction and being adapted to deenergize said drive unit when said tension means has been moved by said biasing means in said generally opposite direction, said actuator means comprising a cam secured to said tension means and a switch mechanism positioned to be actuated by movement of said cam, said switch mechanism being connected to control energization of said drive unit.

5. Apparatus as in claim 4, wherein said cam comprises first, second and third cam surfaces, said first cam surfaces adjoining said second cam surface and said second cam surface adjoining said third cam surface, said first, second and third cam surfaces having different heights and said switch mechanism engaging said cam surfaces as said cam is moved by said tension means, said cam and switch mechanism being constructed such that said drive unit is energized when said third cam surface engages said mechanism and said drive unit is deenergized when said first cam surface engages said switch mechanism, movement of said tension means in said first direction causing said switch mechanism to successively be engaged by said first, second and third cam surfaces, and movement of said tension means in said opposite direction causing said switch mechanism successively be engaged by said third, second and first cam surfaces, and said switch mechanism being constructed such that it energizes said drive unit when said tension means moves in said first direction and said switch mechanism is engaged by the juncture of said second and third cam surfaces, and deenergizes said drive unit when said tension means moves in said opposite direction and said switch mechanism is engaged by the juncture of said first and second cam surfaces.

6. In a machine for utilizing film and arranged to pull film as needed, the improvement comprising mechanism for feeding and transporting the film to the utilizing portion of the machine, comprising a rotatable arbor for supporting a supply roll of film, a drive unit coupled to rotate said arbor when energized, tension means mounted for movement relative to said utilizing portion and said arbor, the path of the film extending from said supply roll, about said tension means, and to the utilizing portion, the film as it is wrapped exerting a pull on said tension means and causing said tension means to be moved in a first direction as an article is being wrapped, biasing means for urging said tension means in a direction generally opposite said first directon and thereby maintaining tension on the film as it is beng wrapped, and actuator means coupled to said tension means for controlling energization of said drive unit, said actuator means being adapted to energize said drive unit when said tension means has been moved by the film in said first direction and being adapted to deenergize said drive unit when said tension means has been moved by said biasing means in said generally opposite direction, said arbor comprising a rotatably mounted tubular member, said drive unit being coupled to rotate said tubular member when energized, said tubular member being constructed to receive a supply roll of film thereover, and said arbor including means for releasably holding a supply roll on said tubular member, said holding means being mounted within the interior of said tubular member and adapted to extend outwardly of said tubular member through openings formed in said tubular member.

7. Apparatus as in claim 6, wherein said holding means comprises a plurality of fingers pivotally mounted within said tubular member for movement in radial planes, said fingers being adapted to be moved radially through said openings in said tubular member, and means for extending and retracting said fingers within said openings.

8. Apparatus as in claim 7 wherein said extending and retracting means comprises a rotatably mounted threaded shaft extending within said tubular member adjacent said fingers, a nut threaded on said shaft and adapted to engage said fingers for forcing said fingers outwardly upon axial movement in a first direction of said nut, said nut including means for preventing substantial rotational movement thereof with said shaft, and means for retracting said fingers when said nut is moved axially in the direction opposite to said first direction upon rotational movement of said threaded shaft.

9. Apparatus as in claim 8, wherein said arbor further includes a knob secured to said shaft and positioned outside of said tubular member for manual rotation of said shaft and said nut.

10. In a wrapping machine for wrapping an article in a film, including a wrapping mechanism for wrapping the film lengthwise about the article, folding the film at the ends of the article under the article, and sealing the film under the article, said wrapping mechanism being constructed to pull film thereto as needed for wrapping an article, the improvement comprising a film feed mechanism for supplying film to said wrapping mechanism, said feed mechanism comprising a drive motor for feeding film when energized and switch means responsive to pull on the film for energizing said drive motor, whereby said wrapping mechanism pulls film when it is needed for wrapping an article, said wrapping mechanism thereby actuating said switch means to energize said drive motor and feed film.

References Cited

UNITED STATES PATENTS

| | | | |
|---|---|---|---|
| 2,727,344 | 12/1955 | Lyon | 53—210 |
| 2,747,349 | 5/1956 | Kottmann | 53—210 |
| 2,775,085 | 12/1956 | Kottmann | 53—210 |
| 2,853,841 | 9/1958 | Wertheimer | 53—210 |
| 2,889,675 | 6/1959 | Anderson | 53—210 X |
| 2,930,171 | 3/1960 | Mason | 53—74 |
| 3,248,848 | 5/1966 | Littlefield | 53—210 |
| 3,248,850 | 5/1966 | Andrews | 53—228 |

WAYNE A. MORSE, JR., Primary Examiner

U.S. Cl. X.R.

53—210, 389; 242—57